United States Patent [19]
Sharkey et al.

[11] 4,031,168
[45] June 21, 1977

[54] COPOLYMERS OF ISOBUTYLENE AND A VINYLBENZENE AND GRAFT POLYMERS THEREOF WITH PIVALOLACTONE

[75] Inventors: William Henry Sharkey; John Ferguson Harris, Jr., both of Wilmington, Del.

[73] Assignee: E. I. Du Pont de Nemours and Company, Wilmington, Del.

[22] Filed: Sept. 25, 1975

[21] Appl. No.: 616,839

Related U.S. Application Data

[63] Continuation-in-part of Ser. No. 508,886, Sept. 24, 1974, abandoned.

[52] U.S. Cl. ............................ 260/896; 260/897 R; 428/461; 526/20
[51] Int. Cl.² .......................................... C08L 23/22
[58] Field of Search ........................... 260/896, 897

[56] References Cited
UNITED STATES PATENTS

| 3,562,360 | 2/1971 | King et al. | 260/898 |
| 3,897,513 | 7/1975 | Sundet | 260/824 R |

FOREIGN PATENTS OR APPLICATIONS 7,003,074   9/1971   Netherlands

OTHER PUBLICATIONS

Plate et al., J. Polymer Sci., (PTC), 22, pp. 547–568 (1969).
Rehner et al., J. Poly. Sci., XI, 21–36 (1953).
Lind et al., Bull. Chem. Soc. Japan, 37, 23–26 (1964).
Imanshi et al., J. Poly. Sci. A3 2455–2474 (1965).

*Primary Examiner*—Carman J. Seccuro

[57] ABSTRACT

Graft copolymers of the formula

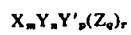

wherein

X is an isobutylene monomer unit,
Y is a non-carboxylated vinylbenzene monomer unit of the formula

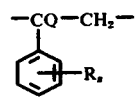

in which
Q is hydrogen or lower alkyl,
R is halogen, lower alkyl, chloro lower alkyl, lower alkoxy, or two adjacent R's together are methylenedioxy, and
$s$ is an integer from 0 to 5,
Y' is a carboxylated Y unit,
Z is a pivalolactone monomer unit,
$m$ represents the number of isobutylene monomer units in the copolymer,
$n$ represents the number of non-carboxylated vinylbenzene monomer units in the copolymer,
$p$ represents the number of carboxylated vinylbenzene monomer units in the copolymer and is about 5 to 100% of $n + p$,
$m$ and $(n + p)$ are in an $m:(n + p)$ ratio of about 2:1 to 1000:1,
$q$ represents the number of pivalolactone monomer units per polypivalolactone side chain graft and is in the range of about 2 to 500,
$r$ represents the number of polypivalolactone side chain grafts in the graft copolymer and is substantially equal to $p$,
X, Y and Y' are randomly interconnected through carbon to carbon linkages with single Y and Y' units predominantly connected only to X units,
$Z_q$ is a single polypivalolactone side chain grafted to a Y' unit through the carboxyl group, and
$(Z_q)_r$ is about 3 to 80% of the total weight of the graft copolymer,
and the copolymer has an $X_m Y_n Y'_p$ equivalent weight per carboxyl group of about 200 to $1 \times 10^5$.

8 Claims, No Drawings

COPOLYMERS OF ISOBUTYLENE AND A VINYLBENZENE AND GRAFT POLYMERS THEREOF WITH PIVALOLACTONE

CROSS-REFERENCE TO RELATED APPLICATION

This is a continuation-in-part of copending application Ser. No. 508,886, filed Sept. 24, 1974 now abandoned.

BACKGROUND OF THE INVENTION

1. Field of the Invention

This invention relates to novel carboxylated isobutylene/vinylbenzene copolymers and to unique thermoplastic graft copolymers of such carboxylated polymers and pivalolactone. The graft copolymers are useful for the preparation of molded objects and self-supporting flexible films. The carboxylated copolymer substrates are separately useful as general adhesives.

2. Description of the Prior Art

1. N. A. Plate, M. A. Jampolskaya, S. L. Davydova and V. A. Kargin [J. Polymer Sci. (Pt. C), 22, 547 (1969)] discloses the treatment of a metallated copolymer of α-p-dimethylstyrene and propylene with $CO_2$ to give a carboxylated copolymer of α-p-dimethylstyrene and propylene. Metallation and carboxylation of homopolymers of styrene and p-methyl styrene is also disclosed.

2. U.S. Pat. No. 3,168,456 (1965, to Phillips Petroleum Co.) discloses the preparation of polymeric carboxylic acids by exposing a mixture of a 1-olefin (chosen from a group including isobutylene and styrene) and $CO_2$ to ionizing radiation.

3. U.S. Pat. No. 3,346,631 (1967, to American Synthetic Rubber Corp.) discloses the treatment of copolymers of dienes, e.g., butadiene or isoprene, and an olefin, e.g., styrene or isobutylene, with ozone, followed by a subsequent work-up which leads to carboxylated polymers.

4. Belgian Pat. No. 786,747 describes random graft copolymers containing at least one β-lactone side chain grafted onto an amorphous base polymer through a carbanion, carboxylic anion or alkoxide anion site. The carboxylic anion sites described are those normally present in copolymers derived from esters, amides and anhydrides.

SUMMARY OF THE INVENTION

In accordance with this invention graft copolymers have been discovered which are of the formula $$X_m Y_n Y'_p (Z_q)_r$$

wherein
X is an isobutylene monomer unit,
Y is a vinylbenzene monomer unit of the formula

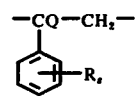

in which
Q is hydrogen or lower alkyl,
R is halogen, lower alkyl, chloro lower alkyl, lower alkoxy, or two adjacent R's together are methylenedixoy, and
s is an integer from 0 to 5,
Y' is a carboxylated Y unit,
Z is a pivalolactone monomer unit,
m represents the number of isobutylene monomer units in the copolymer,
n represents the number of non-carboxylated vinylbenzene monomer units in the copolymer,
p represents the number of carboxylated vinylbenzene monomer units in the copolymer and is about 5 to 100% of $(n + p)$,
m and $(n + p)$ are in an $m:(n + p)$ ratio of about 2:1 to 1000:1,
q represents the number of pivalolactone monomer units per polypivalolactone side chain graft and is in the range of about 2 to 500,
r represents the number of polypivalolactone side chain grafts in the graft copolymer and is substantially equal to p,
X, Y and Y' are randomly interconnected through carbon to carbon linkages with single Y and Y' units predominantly connected only to X units,
$Z_q$ is a single polypivalolactone side chain grafted to a Y' unit through the carboxyl group, and
$(Z_q)_r$ is about 3 to 80% of the total weight of the graft copolymer.
and the copolymer has an $X_m Y_n Y'_p$ equivalent weight per carboxyl group of about 200 to $1 \times 10^5$.

This invention also includes the carboxylated copolymers of the formula

wherein X, Y, Y', m, n and p are as described before, and the copolymer has an equivalent weight per carboxyl group of about 200 to $1 \times 10^5$.

DETAILED DESCRIPTION OF THE INVENTION

The graft copolymers of this invention are prepared from copolymers of isobutylene and one or more vinylbenzene of the formula

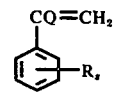

in which Q is hydrogen or lower alkyl, R is halogen, lower alkyl, chloro lower alkyl, lower alkoxy, or two adjacent R's together are methylenedioxy, and s is an integer from 0 to 5. Suitable vinylbenzenes include styrene, o-, m-, and p-vinyltoluene and mixturs thereof, 4-chloromethylstyrene, 2-chlorostyrene, 3-chlorostyrene, 4-chlorostyrene, 2,4-dichlorostyrene, 4-bromostyrene, 3-fluorostyrene, 4-fluorostyrene, 2,5-difluorostyrene, 2-methoxystyrene, 4-methoxystyrene, 2,4-dimethoxystyrene, 3,4-methylenedioxystyrene, 4-ethylstyrene, 4-n-butylstyrene, 4-t-butylstyrene, 3-dodecylstyrene, 2,6-dimethylstyrene, 2,4,6-trimethylstyrene, 2,3,5,6-tetramethylstyrene, 3,α-dimethylstyrene, 4, α-dimethylstyrene, α-methylstyrene, α-ethylstyrene, and mixtures thereof. The preferred vinylbenzenes are vinyltoluene, styrene and α-methylstyrene.

The isobutylene/vinylbenzene copolymer is carboxylated to form a novel carboxylated isobutylene/vinylbenzene copolymer of the formula

in which

X is an isobutylene monomer unit,
Y is a non-carboxylated vinylbenzene monomer unit,
Y' is a carboxylated vinylbenzene monomer unit,
m represents the number of isobutylene monomer units in the copolymer,
n represents the number of non-carboxylated vinylbenzene monomer units in the copolymer, and
p represents the number of carboxylated vinylbenzene monomer units in the copolymer. In the above formula the mole ratio of isobutylene to noncarboxylated and carboxylated vinylbenzene $[m:(n+p)]$ in the copolymer is broadly in the range from about 2:1 to 1000:1, preferably in the range from about 5:1 to 600:1, and most preferably in the range from about 8:1 to 440:1. The amount of vinylbenzene which is carboxylated is about 5 to 100% by weight of the total vinylbenzene, that is, $p$ is about 5 to 100% of $(n + p)$.

These copolymers, before carboxylation, have molecular weights broadly in the range of about 1000 to 5 × $10^6$, preferably in the range of about 2000 to 2 × $10^6$, and most preferably in the range of about 5000 to 1 × $10^6$. These molecular weights are measured by viscosity techniques. The copolymers have equivalent weights per carboxyl group ($X_mY_nY'_p$ divided by $p$) broadly in the range of about 200 to 1 × $10^5$, preferably in the range of about 600 to 6 × $10^4$, and most preferably in the range of about 1000 to 5 × $10^4$.

The graft copolymers of this invention are of the formula $$X_mY_nY'_p(Z_q)_r$$

in which
Z is a pivalolactone monomer unit,
q represents the number of pivalolactone monomer units per polypivalolactone side chain graft,
r represents the number of polypivalolactone side chain grafts in the graft copolymer, and
$Z_q$ is a single polypivalolactone side chain grafted to a Y' unit through the carboxyl group.

The number of pivalolactone monomer units (q) per polypivalolactone sidechain are broadly in the range of about 2 to 500, preferably in the range of about 3 to 250, and most preferably in the range of about 5 to 200. The percent by weight of polypivalolactone $[(Z_q)_r]$ in the graft copolymer is broadly in the range of about 3 to 80%, preferably in the range of about 5 to 60%, and most preferably in the range of about 10 to 50%. The value of r in a given graft copolymer is substantially equal to the value of $p$, that is, equal to or slightly less than the value of $p$.

The graft copolymers are prepared by the following sequence of steps, starting with a preformed isobutylene/vinylbenzene copolymer: (1) metallation of the copolymer with sec-butyllithium (s-BuLi) in the presence of N,N,N',N'-tetramethylethylenediamine (TMEDA), (2) reaction of the metallated copolymer with carbon dioxide to give lithium carboxylate groups, (3) acidification to form free carboxylic acid groups, (4) neutralization of all or most of the carboxylic acid groups with tetra(n-butyl)ammonium hydroxide (TBAOH), (5) reaction with pivalolactone (PVL) to form carboxyl-attached polypivalolactone sidechains, and (6) acidification to terminate the ends of the polypivalolactone grafts.

The following equations illustrate the reaction sequence for the process as applied to isobutylene-styrene substrate copolymers, in which metallation and subsequent carboxylation presumably occurs on selected α-carbons attached to the otherwise unsubstituted phenyl groups of the copolymer:

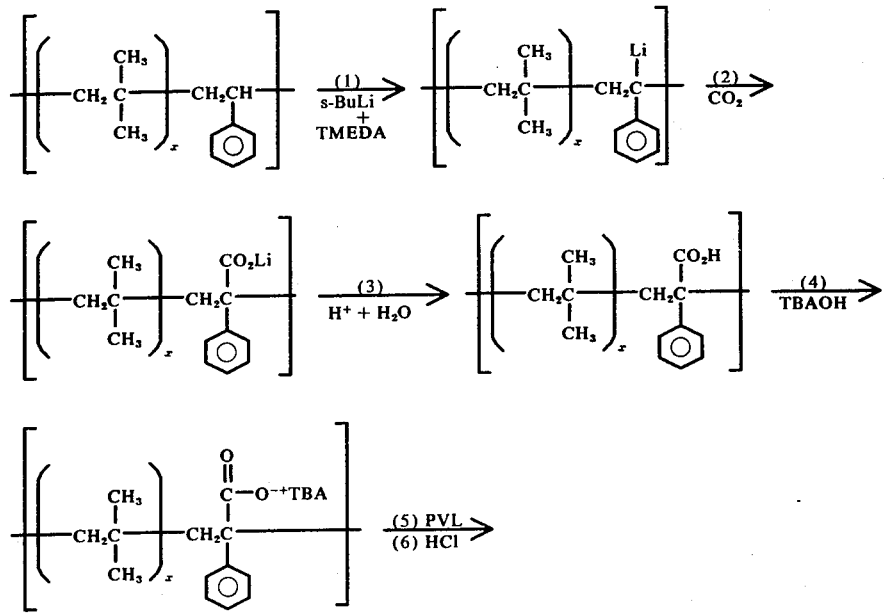

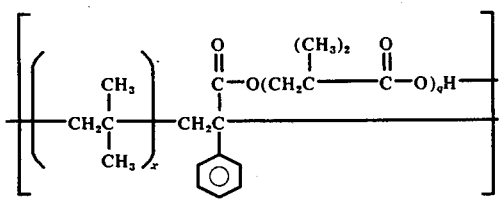

Likewise, the following equations illustrate the reaction sequence for the process as applied to isobutylene/vinyltoluene substrate copolymers, in which metallation and subsequent carboxylation occurs preferentially on selected free o-, m-, or p-methyl groups attached to the phenyl groups of the copolymer:

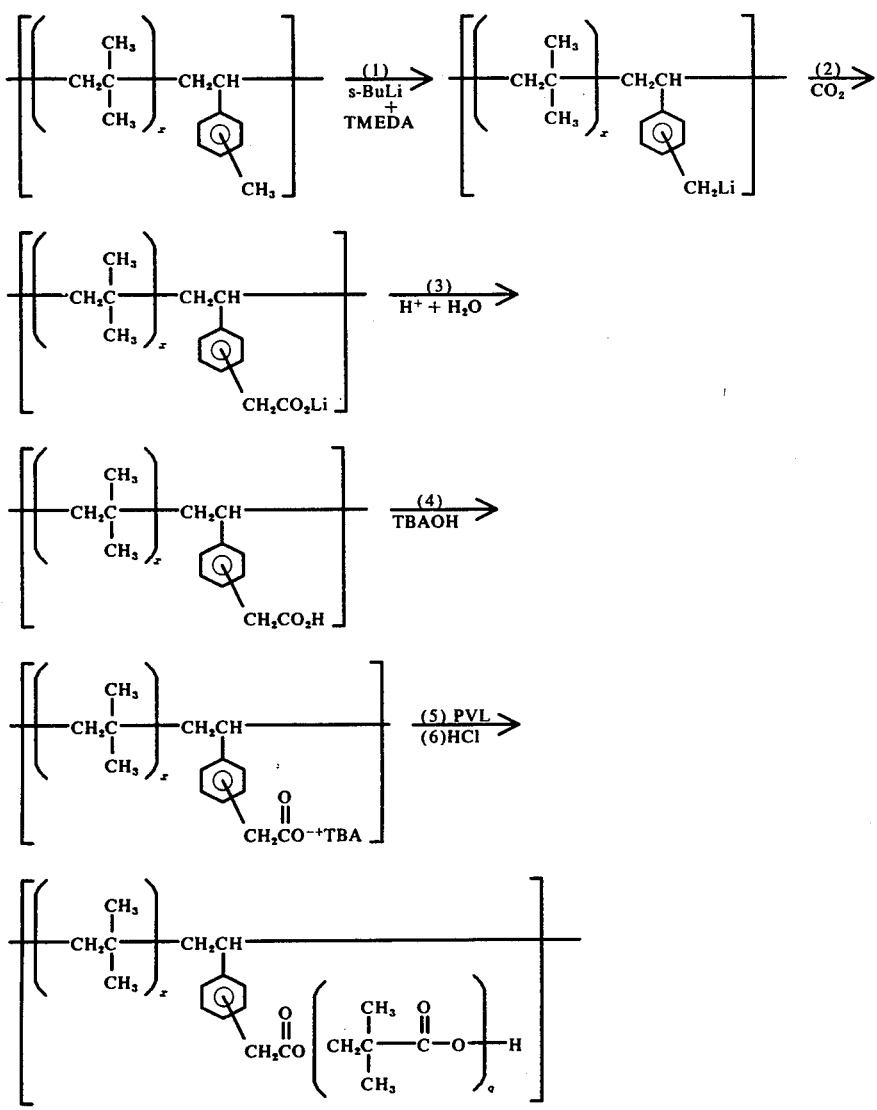

In a similar manner, if substrate copolymers comprising isobutylene/α-methylstyrene, isobutylene/α,4-dimethylstyrene, isobutylene/p-vinyltoluene/α,p-dimethylstyrene, isobutylene/styrene/p-vinyltoluene or isobutylene/styrene/αmethylstyrene are subjected to the same sequence of steps, graft copolymes are obtained in which polypivalolacetone grafts are connected to the substrate copolymers.

The carboxylated isobutylene/vinylbenzene copolymers of the invention may be isolated with the carboxyl groups in salt form, in free acid form, or in lower alkyl ester form. These copolymers can be isolated by evaporation to dryness of their solutions in cyclohexane and tetrahydrofuran, as obtained at the end of step (3) in the foregoing sequence of reactions. Samples of such isolated copolymers show the presence of absorption bands in the range of 5.85–5.87 $\mu$ when examined by infrared spectroscopy. When deposited by evaporation on strips of aluminum, adherent tacky films are obtained. Such treated strips produce strongly adherent laminates when pressed together, and paper strips pressed onto the tacky films are strongly attached to the aluminum.

The graft copolymers of the invention are thermoplastic solids which are usually elastomeric and sometimes tacky. They can be molded and remoled at about 200° C. into self-supporting films which are usually clear, have ultimate tensile strengths in the range from about 500 to 8000 psi, and give elongations in the range from about 10 to 680%. Test data show a rough dependency of elongation upon the molecular weight of the substrate and an inverse dependency of elongation upon pivalolactone content of the product. Copolymers containing about 50% by weight or more of pivalolactone are more plastic than elastic, while copolymers containing less than about 40% of pivalolactone are quite elastic with elongations of over about 500%. Accordingly, the graft copolymers offer a variety of properties and can range in utility from relatively rigid molded plastics to elastic molded rubbers. The elastomeric products, besides being thermoplastic, have the additional property of good resistance to oxidative degradation.

EXAMPLES OF THE INVENTION

The following examples, illustrating the novel carboxylated copolymers and graft copolymers of this invention, are given without any intention that the invention be limited thereto. All parts and percentages are by weight.

A. Preparation of the Substrate Copolymers

Data on individual substrate copolymers of isobutylene (IB) with vinyltoluene (VT), styrene (S), α-methylstyrene (MS) or α,p-dimethylstyrene (DMS) are given in Table I. The polymers are prepared by cationic polymerization using ethylaluminum dichloride (EtAlCl$_2$), isobutylaluminum dichloride (i-BuAlCl$_2$), or a mixture of diethylaluminum chloride (Et$_2$AlCl) and t-butyl chloride (t-BuCl) as the initiator. The solvents used were methyl chloride (CH$_3$Cl) and heptane (C$_7$H$_{16}$). The vinyltoluene designated in Table I as "VT" was a mixture of isomers in which the para and meta isomers predominated. "VB" is used to designate the generic class of vinylbenzenes.

All of the preparations were carried out under dry nitrogen in a glass reactor flask fitted with a stirrer, syringe cap and a nitrogen bubbler. The general procedure comprised cooling the reactor to −78° C, adding the solvent (via syringe for heptane, or in the case of methyl chloride by condensing it directly into the reactor), adding the isobutylene from a calibrated trap, and then adding the comonomer(s) and the catalyst via syringe. When diethylaluminum chloride in combination with t-butyl chloride was used as the catalyst, the two materials were added separately, the diethylaluminum chloride generally being added first. The polymerization usually began immediately. After the polymerization appeared to be completed, the reactor was allowed to stand in the cooling bath for 0.5 hour, whereupon methanol or ethanol was added to destroy the catalyst. The mixture was allowed to warm to room temperature, and the polymer was precipitated by the addition of methanol, or ethanol when heptane was used as the solvent. The polymer was washed several times with methanol and dried under vacuum at 75° C. The products obtained varied from viscous liquids to tough elastomeric solids.

Ultraviolet spectra were measured in cyclohexane solution, and from the intensity of the aromatic absorption, the concentration of aromatic groups in the polymer (expressed as equivalent weight per aromatic residue in Table I) was estimated. Molecular weights were estimated by viscosity determination.

TABLE I

| | | | | | Substrate Copolymers | | | | |
|---|---|---|---|---|---|---|---|---|---|
| Ex. | IB, ml (at −76°) | VB (ml) | Mole Ratio IB/VB | Solvent (ml) | Al Catalyst (ml)* + Co-catalyst (μl) | Wt. of Product (g) | Inh. Vis. (0.1% in Tol., 30°) | Estimated Molecular Wt. | Est'd Eq. Wt. per Aromatic Residue |
| A | 50 | VT (2.75) | 27/1 | C$_7$H$_{16}$(100) | Et$_2$AlCl (2) t-BuCl (30) | 30.21 | 0.21 | 32,000 | 1352 |
| B | 150 | VT (8.25) | 27/1 | C$_7$H$_{16}$(300) | Et$_2$AlCl (6) t-BuCl(120) | 93.0 | 0.28 | 50,000 | 1437 |
| C | 50 | VT (0.95) | 77/1 | C$_7$H$_{16}$ | Et$_2$AlCl (2) t-BuCl (70) | 31.77 | 0.33 | 63,500 | 3709 |
| D | 50 | VT (0.70) | 105/1 | C$_7$H$_{16}$(100) | Et$_2$AlCl (2) t-BuCl (30) | 28.41 | 0.35 | 69,500 | 4887 |
| E | 50 | VT (0.49) | 150/1 | CH$_3$Cl(100) | Et$_2$AlCl (1) t-BuCl (10) | 29.9 | 0.35 | 70,000 | 4775 |
| F | 100 | VT (0.98) | 150/1 | CH$_3$Cl(200) | Et$_2$AlCl (1) t-BuCl (20) | 55.5 | 0.59 | 150,000 | 6009 |
| G | 100 | VT (2.0) | 74/1 | CH$_3$Cl(300) | Et$_2$AlCl (2) t-BuCl (30) | 46.5 | 0.95 | 305,000 | 3652 |
| H | 100 | p-VT (2) | 74/1 | CH$_3$Cl(300) | Et$_2$AlCl (2) t-BuCl(120) | 50.1 | 1.42 | 550,000 | 6289 |
| I | 50 | S (2) | 32/1 | C$_7$H$_{16}$(100) | Et$_2$AlCl (1) t-BuCl (10) | 32.0 | 0.65 | 170,000 | 1507 |
| J | 100 | S (2) | 63/1 | CH$_3$Cl(300) | EtAlCl$_2$ (2) | 65.5 | 0.55 | 135,000 | 3190 |
| K | 100 | MS (2) | 72/1 | CH$_3$Cl(300) | i-BuAlCl$_2$ (2) | 71.5 | 0.30 | 56,500 | 3260 |
| L | 100 | MS (4) | 36/1 | CH$_3$Cl(300) | i-BuAlCl$_2$ (2) | 66.4 | 0.24 | 39,000 | 1801 |
| M | 100 | p-VT (1) | 143/.97/1 | CH$_3$Cl(300) | i-BuAlCl$_2$ (2) | 62.8 | 0.39 | 80,500 | 3540 |
| N | 100 | p-VT (2) | 71.6/.97/1 | CH$_3$Cl(300) | i-BuAlCl$_2$ (2) | 62.5 | 0.28 | 50,000 | 1801 |
| O | 100 | DMS (1.2) p-VT (1) | 147/1.08/1 | CH$_3$Cl(300) | Et$_2$AlCl (3) t-BuCl (60) | 66.0 | 0.5 | 110,000 | 5181 |

*Et$_2$AlCl was 24.8% in C$_7$H$_{16}$
*Et$_2$AlCl was 24.8% in C$_7$H$_{16}$; EtAlCl$_2$ was 25.1% in C$_7$H$_{16}$; i-BuAlCl$_2$ was 38.25% in isooctane.

B. Carboxylation of the Substrate Copolymers (Steps 1–4)

Data on individual examples are given in Table II. The reactor was dried by heating to 125° C before assembly, fitted with a magnetic stirrer, a hose connector and a syringe adapter, and then heated after assembly with nitrogen passing through the system. Operating with an internal atmosphere of nitrogen, the reactor was charged with cyclohexane (purified under nitrogen by refluxing over and distilling from sodium tape) and a substrate copolymer. The mixture was stirred and heated until the polymer was in solution, and then it was cooled to room temperature and charged with N,N,N',N'-tetramethylethylenediamine (TMEDA, freshly distilled from sodium) and a solution of sec-butyllithium (s-BuLi) in hexane or cyclohexane. The orange-brown solution was allowed to stir for 1 hour at room temperature, and then was transferred under nitrogen back-pressure through a U-tube into another reactor containing stirred tetrahydrofuran (THF, purified under nitrogen by refluxing over and distilling from sodium) which had been previously saturated with rigorously purified carbon dioxide. Vigorous bubbling of purified carbon dioxide through the solution was continued during introduction of the metallated polymer solution. The resulting colorless solution was stirred under nitrogen.

The carboxylation reaction mixture was placed under vacuum to remove excess carbon dioxide, and was then added with vigorous stirring by means of a paddle stirrer into dilute aqueous sulfuric acid contained in a separatory funnel. After several minutes of vigorous stirring, reagent grade methanol was added with gentle stirring, and then after separation, the aqueous layer was drawn off and discarded. The organic layer was stirred vigorously ten times consecutively with water, each washing being followed by the addition of an equal volume of reagent grade methanol with gentle stirring to aid in phase separation. If necessary, additional quantities of cyclohexane or THF were added to help avoid emulsion formation. During the washing procedure the pH of the washings leveled at 6–7 after the fourth washing, as judged by testing with pH paper. After the final wash, the polymer solution was placed in a flask equipped with a Dean-Stark separator and refluxed until no more water separated. The flask was then fitted with a still head and solvent was distilled until the concentration of the solution was about 10% or until the solution became viscous. The volume of the concentrate was then increased by 25–40% with dry THF, and the solids content of the resulting solution was determined by evaporation of a small measured quantity. The equivalent weight per acid group of the polymer was determined by titration to a phenolphthalein end point with a standardized solution of tetra(n-butyl)ammonium hydroxide (TBAOH) in methanol.

TABLE II

| | | Carboxylated Substrate Copolymers | | | | | |
|---|---|---|---|---|---|---|---|
| Example | Substrate Copolymer Example (g) | Cyclohexane ml | TMEDA ml | s-BuLi Normality (ml) | $CO_2$ Sat'd THF (ml) | 1.2N $H_2SO_4$ ml | Eq. Wt. per Acid Group |
| 1 | A (10.81) | 97 | 1.82 | 1.15 (10.44) | 300 | 110 | 2569 |
| 2 | B (11.00) | 100 | 1.74 | 1.15 (9.99) | 450 | 115 | 3510 |
| 3 | C (10.00) | 100 | 1.75 | 1.27 (9.09) | 450 | 150 | 6733 |
| 4 | C (11.00) | 100 | 1.92 | 1.27 (10.00) | 450 | 170 | 5086 |
| 5 | D (10.25) | 100 | 0.83 | 1.15 (4.78) | 300 | 53 | 10460 |
| 6 | E (11.00) | 100 | 0.92 | 1.27 (4.80) | 450 | 61 | 13341 |
| 7 | F (10.00) | 225 | 1.45 | 1.27 (7.50) | 450 | 150 | 17267 |
| 8 | F (10.00) | 225 | 1.45 | 1.27 (7.50) | 450 | 150 | 14640 |
| 9 | F (10.00) | 225 | 1.45 | 1.27 (7.50) | 450 | 140 | 14658 |
| 10 | G (10.00) | 260 | 1.45 | 0.93 (10.25) | 450 | 150 | 10183 |
| 11 | G (10.00) | 225 | 1.45 | 1.27 (7.50) | 450 | 150 | 10905 |
| 12 | G (10.00) | 225 | 1.45 | 1.27 (7.50) | 450 | 150 | 12064 |
| 13 | H (10.00) | 225 | 1.45 | 0.93 (10.25) | 450 | 150 | 24,922 |
| 14 | H (10.00) | 295 | 1.45 | 0.93 (10.25) | 450 | 150 | 16,512 |
| 15 | H (10.00) | 300 | 1.45 | 0.93 (10.25) | 450 | 150 | 10,326 |
| 16 | I (10.00) | 275 | 1.45 | 1.27 (7.58) | 450 | 135 | 6,005 |
| 17 | I (10.00) | 275 | 2.08 | 1.25 (11.00) | 450 | 150 | 8,393 |
| 18 | J (10.00) | 200 | 2.08 | 1.25 (11.00) | 450 | 150 | 19.187 |
| 19 | K (20.00) | 200 | 3.50 | 1.505 (15.48) | 900 | 500 | 12,770 |
| 20 | L (30.00) | 400 | 10.35 | 1.44 (48.15) | 1350 | 500 | 5,366 |
| 21 | M (32.00) | 400 | 6.58 | 1.44 (30.62) | 1350 | 500 | 10,565 |
| 22 | N (36.00) | 500 | 10.35 | 1.44 (48.16) | 1600 | 600 | 4,387 |
| 23 | O (20.00) | 250 | 3.05 | 1.505 (13.50) | 900 | 500 | 10,646 |

C. Grafting of Pivalolactone to the Carboxylated Substrate Copolymers (Steps 5 and 6)

Data on individual examples are given in Table III. The carboxylated polymer solution from Part B was treated at room temperature with up to an equivalent of 1N TBAOH in methanol. After the resulting solution had been stirred for at least 15 minutes, pivalolactone (PVL) which had been purified by passing it through neutral alumina was added and stirring was continued. Usually within about 0.5 hour the stirred solution became gelled and it was then let stand overnight. The next day the gelled material was transferred to a blender and mixed vigorously with THF until a smooth paste was obtained. The mixture was acidified with an excess of concentrated aqueous hydrochloric acid (HCl) in 95% ethanol (5 ml conc. HCl per 20 ml alcohol) and vigorous mixing was continued for several minutes. The resulting mixture was diluted with 95% ethanol, and the resulting polymer slurry was stirred for several minutes. The precipitated polymer was isolated by filtration, washed on the filter with additional ethanol, and then successively washed four times in a blender with fresh portions of ethanol. After the second blending the washings no longer contained chloride ion according to tests with aqueous silver nitrate. The isolated washed polymer was dried for several hours in a vacuum oven at 70° C and then weighed. The dried polymer was stirred for 18–24 hours at room temperature in cyclohexane (about 1 liter per 20 g polymer) to remove any soluble material. The extracted polymer was finally isolated and dried again in a vacuum oven at 70° C. The final product was analyzed for carbon and hydrogen in order to determine the PVL content. Test films were pressed at 180°–220° C under several thousand pounds pressure for 1 minute.

TABLE III

Graft Copolymers

| Ex. | Carboxylated Substrate g of Solution (g of Polymer) | 1N TBAOH ml | PVL ml | Crude Product g | Cyclohexane - Extracted Product | | | | | |
|---|---|---|---|---|---|---|---|---|---|---|
| | | | | | g | Description | PVL % | $q^*$ | $\sigma_s^*$ psi | $\epsilon_s^*$ % |
| 1 | 50.88 (5.17) | 1.00 | 1.81 | 6.81 | 5.61 | Colorless, spongy | 32 | 12 | 984 | 21.7 |
| 2 | 85.00 (9.66) | 2.34 | 9.66 | 17.76 | 16.36 | Slight yellow, hard | 52 | 38 | 2165 | 10.0 |
| 3 | 123.50 (9.04) | 1.14 | 6.03 | 13.71 | 12.32 | Colorless, spongy | 44 | 53 | 1542 | 134.0 |
| 4 | 111.50 (10.28) | 1.70 | 10.00 | 18.00 | 16.60 | Colorless, spongy | 54 | 49 | 1845 | 47.0 |
| 5 | 76.23 (7.30) | 0.59 | 2.40 | 9.18 | 6.45 | Colorless, spongy | 31 | 47 | 909 | 569.0 |
| 6 | 103.30 (10.29) | 0.66 | 8.42 | 22.40 | 15.04 | Colorless, soft | 50 | 109 | 1536 | 157.0 |
| 7 | 112.80 (9.44) | 0.44 | 2.36 | 11.87 | 9.81 | Colorless, slightly tacky, spongy | 25 | 58 | 1029 | 639.0 |
| 8 | 136.00 (9.03) | 0.49 | 3.87 | 10.90 | 9.80 | Colorless, slightly tacky, spongy | 31 | 66 | 1672 | 557.0 |
| 9 | 139.30 (10.14) | 0.55 | 6.76 | 15.88 | 14.06 | Colorless, slightly tacky, spongy | 43 | 110 | 1553 | 390.0 |
| 10 | 87.70 (6.40) | 0.50 | 1.60 | 7.82 | 6.98 | Colorless, slightly tacky, spongy | 19 | 24 | 1544 | 633.0 |
| 11 | 157.30 (9.88) | 0.72 | 3.30 | 12.58 | 11.09 | Colorless, tough, spongy | 25 | 36 | 1877 | 680.0 |
| 12 | 170.70 (9.56) | 0.63 | 5.20 | 14.43 | 13.47 | Colorless, slightly tacky, spongy | 37 | 71 | 1938 | 517.0 |
| 13 | 159.50 (9.13) | 0.29 | 2.30 | 11.59 | 10.00 | Colorless, tough, spongy | 21 | 66 | 1828 | 624.0 |
| 14 | 168.90 (6.87) | 0.33 | 2.70 | 8.96 | 8.56 | Colorless, slightly tacky, spongy | 29 | 66 | 2146 | 646.0 |
| 15 | 142.20 (7.47) | 0.58 | 5.00 | 11.96 | 11.39 | Colorless, slightly tacky, spongy | 42 | 75 | 2403 | 532.0 |
| 16 | 115.00 (9.38) | 1.25 | 6.30 | 14.63 | 13.34 | Colorless, slightly tacky, spongy | 43 | 45 | 861 | 362.0 |
| 17 | 107.80 (8.26) | 0.79 | 2.80 | 10.18 | 9.25 | Colorless, spongy | 30 | 36 | 684 | 648.0 |
| 18 | 113.00 (9.01) | 0.38 | 6.00 | 14.43 | 12.79 | Colorless, tough, spongy | 45 | 157 | 482 | 103.0 |
| 19 | 84.3 (8.70) | 0.55 | 4.70 | 12.90 | 9.80 | Colorless, spongy | 50 | 127 | 1728 | 42 |
| 20 | 76.0 (8.21) | 1.22 | 3.50 | 11.68 | 8.96 | Colorless, spongy | 39 | 34 | 561 | 22 |
| 21 | 207.3 (27.38) | 2.07 | 14.70 | 39.0 | 36.5 | Colorless, spongy, tacky | 36 | 60 | 1635 | 280 |
| 22 | 271.9 (33.88) | 6.20 | 18.20 | 51.3 | 48.0 | Colorless, spongy | 39 | 28 | 1176 | 83 |
| 23 | 221.2 (17.89) | 1.34 | 9.60 | 26.33 | 23.64 | Colorless, spongy, slightly tacky | 35 | 56 | 1247 | 390 |

$q^*$ = molecules of PVL per site;
$\sigma_s^*$ = Tensile at break;
$\epsilon_s^*$ = Elongation at break.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

We claim:

1. A graft copolymer of the formula

wherein
  X is an isobutylene monomer unit,
  Y is a vinylbenzene monomer unit of the formula

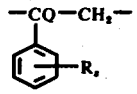

in which
  Q is hydrogen or lower alkyl
  R is halogen, lower alkyl, chloro lower alkyl, lower alkoxy, or two adjacent R's together are methylenedioxy, and
  s is an integer from 0 to 5,
  Y' is a carboxylated Y unit,
  Z is a pivalolactone monomer unit,
  m represents the number of isobutylene monomer units in the copolymer,
  n represents the number of non-carboxylated vinylbenzene monomer units in the copolymer,
  p represents the number of carboxylated vinylbenzene monomer units in the copolymer and is 5 to 100% of $(n + p)$,
  m and $(n + p)$ are in an m: $(n + p)$ ratio of 2:1 to 1000:1,
  q represents the number of pivalolactone monomer units per polypivalolactone side chain graft and is in the range of 2 to 500,
  r represents the number of polypivalolactone side chain grafts in the graft copolymer and is substantially equal to p,
  X, Y and Y' are randomly interconnected through carbon to carbon linkages with single Y and Y' units predominantly connected only to X units,
  $Z_q$ is a single polypivalolactone side chain grafted to a Y' unit through the carboxyl group, and
  $(Z_q)_r$ is 3 to 80% by weight of the graft copolymer, and the copolymer has an $X_m Y_n Y'_p$ equivalent weight per carboxyl group of 200 to $1 \times 10^5$.

2. The graft copolymer of claim 1 in which the non-carboxylated isobutylene/vinylbenzene copolymer from which the graft copolymer is obtained by carboxylation and grafting has a molecular weight in the range of 1000 to $5 \times 10^6$.

3. The graft copolymer of claim 2 in which the vinylbenzene is selected from the group consisting of vinyltoluene, styrene and α-methylstyrene.

4. The graft copolymer of claim 3 in which the non-carboxylated substrate copolymer has a molecular weight in the range of 2000 to $2 \times 10^6$, m: $(n + p)$ is in a ratio of 5:1 to 600:1, there are 3 to 250 pivalolactone monomer units per polypivalolactone side chain graft, the pivalolactone is 5 to 60% by weight of the graft copolymer, and the copolymer has an equivalent weight per carboxyl group of 600 to $6 \times 10^4$.

5. The graft copolymer of claim 3 in which the non-carboxylated substrate copolymer has a molecular weight in the range of 5000 to $1 \times 10^6$, $m: (n+p)$ is in a ratio of 8:1 to 440:1, there are 5 to 200 pivalolactone monomer units per polypivalolactone side chain graft, the amount of pivalolactone in the graft copolymer is 10 to 50% by weight, and the copolymer has an equivalent weight per carboxyl group of 1000 to $5 \times 10^4$.

6. The graft copolymer of claim 5 in which the vinylbenzene is vinyltoluene.

7. The graft copolymer of claim 5 in which the vinylbenzene is styrene.

8. The graft copolymer of claim 5 in which the vinylbenzene is α-methylstyrene.

* * * * *

UNITED STATES PATENT OFFICE
CERTIFICATE OF CORRECTION

PATENT NO. : 4,031,168
DATED : June 21, 1977
INVENTOR(S) : William Henry Sharkey; John Ferguson Harris, Jr.

It is certified that error appears in the above-identified patent and that said Letters Patent are hereby corrected as shown below:

Column 5, line 63, "αmethylstyrene" should read -- α-methylstyrene --.

Columns 7 and 8, Table I, Example C, under the heading "Solvent", the entry "$C_7H_{16}$" should read -- $C_7H_{16}(100)$ --.

Columns 7 and 8, Table I, Example M, under the heading "VB" the entry "p-VT(1)" should read -- p-VT(1) / MS(1) --.

Columns 7 and 8, Table I, Example N, under the heading "VB", the entry "p-VT(2)" should read -- p-VT(2) / MS(2) --.

Columns 7 and 8, Table I, delete the first line of the footnote.

Columns 9 and 10, Table II, Example 20, under the heading "s-BuLi Normality", the entry "1.44 (48.15)" should read -- 1.44 (48.16) --.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*